US006267252B1

(12) United States Patent
Amsler

(10) Patent No.: US 6,267,252 B1
(45) Date of Patent: Jul. 31, 2001

(54) FINE PARTICLE FILTRATION MEDIUM INCLUDING AN AIRLAID COMPOSITE

(75) Inventor: Nicole Michele Amsler, Cartersville, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/457,627

(22) Filed: Dec. 8, 1999

(51) Int. Cl.$^7$ ............................ B01D 29/00; B01D 29/05
(52) U.S. Cl. ............................ 210/490; 55/527; 210/483; 210/491; 210/496; 210/503; 210/504; 210/505; 210/506; 210/508; 428/221; 428/297.4; 428/296.7
(58) Field of Search ............................... 210/500.1, 503, 210/504, 505, 506, 508, 483, 490, 491, 496; 428/221, 292.4, 297.4, 296.7; 55/524, 527

(56) References Cited

U.S. PATENT DOCUMENTS

| | | | |
|---|---|---|---|
| 2,517,753 | 8/1950 | Ximenez et al. | 210/204 |
| 3,003,643 | 10/1961 | Thomas | 210/491 |
| 3,073,735 | 1/1963 | Till et al. | 156/38 |
| 3,158,532 | 11/1964 | Pall et al. | 162/103 |
| 3,238,056 | 3/1966 | Pall et al. | 117/98 |
| 3,246,767 | 4/1966 | Pall et al. | 210/505 |
| 3,251,475 | 5/1966 | Till et al. | 210/508 |
| 3,338,992 | 8/1967 | Kinney | 264/24 |
| 3,341,394 | 9/1967 | Kinney | 161/72 |
| 3,502,763 | 3/1970 | Hartmann | 264/210 |

(List continued on next page.)

FOREIGN PATENT DOCUMENTS

98/52745    11/1998   (WO).

OTHER PUBLICATIONS

Kosa, Fiber Solutions for Nonwovens, "Celbond® Bicomponent Fibers" Product Specification Sheet, 1 page (undated).
Kosa, Fiber Solutions for Nonwovens, "Celbond® Guide for Dry–Formed Nonwoven Fabric Applications" Product Specification Sheet, 3 pages (undated).
Kosa, Fiber Solutions for Nonwovens, "Polyester Fibers for Airlaid Processes", Product Specification Sheet, 1 page (undated).

Primary Examiner—John Kim
(74) Attorney, Agent, or Firm—William W. Letson; Lisa J. Moyles

(57) ABSTRACT

The present invention pertains to a filter medium including an airlaid composite, which is made of pulp fibers, at least about 2% by weight bicomponent fiber, and moisture. This airlaid composite is unique in that, when used as a filter medium, it exhibits advantageous filtering properties as well as physical strength. The bicomponent fibers of the present invention include a first polymer component and a second polymer component, and the first polymer component melts at a temperature lower than the melting temperature of the second polymer component. Mixing of the pulp fibers with the bicomponent fibers is done in such a way that the fibers are evenly dispersed in the airlaid composite. This airlaid composite is then heated such that at least a portion of the first polymer component of the bicomponent fiber is melted, which bond the bicomponent fibers to many of the pulp and other bicomponent fibers when cooled. Moisture is added to the composite to further facilitate bonding when the composite is subsequently subjected to calendering. Optionally, a support structure may be used to supplement the strength of the airlaid composite. The filter medium of the present invention is characterized by a drape stiffness of at least about 6 cm, and tensile strength of at least about 4 kg. It may also exhibit relatively low average pore size and bubble point.

28 Claims, 12 Drawing Sheets

U.S. PATENT DOCUMENTS

| | | | |
|---|---|---|---|
| 3,542,615 | 11/1970 | Dobo et al. | 156/181 |
| 3,573,158 | 3/1971 | Pall et al. | 162/131 |
| 3,591,010 | 7/1971 | Pall et al. | 210/493 |
| 3,692,618 | 9/1972 | Dorschner et al. | 161/72 |
| 3,793,678 | 2/1974 | Appel | 19/156.3 |
| 3,802,817 | 4/1974 | Matsuki et al. | 425/66 |
| 3,825,194 | 7/1974 | Buell | 241/191 |
| 3,842,007 | 10/1974 | Caputi, Jr. et al. | 210/65 |
| 3,849,241 | 11/1974 | Butin et al. | 161/169 |
| 4,025,438 | 5/1977 | Gelman et al. | 210/484 |
| 4,033,881 | 7/1977 | Pall | 210/491 |
| 4,100,324 | 7/1978 | Anderson et al. | 428/288 |
| 4,157,967 | 6/1979 | Meyst et al. | 210/449 |
| 4,280,970 | 7/1981 | Kesting | 264/1.7 |
| 4,340,563 | 7/1982 | Appel et al. | 264/518 |
| 4,483,771 | 11/1984 | Koch | 210/490 |
| 4,539,113 | 9/1985 | Tomita et al. | 210/323.2 |
| 4,818,464 | 4/1989 | Lau | 264/510 |
| 5,228,994 | 7/1993 | Tkacik et al. | 210/500.29 |
| 5,246,772 * | 9/1993 | Manning | 428/284 |
| 5,290,449 | 3/1994 | Heagle et al. | 210/503 |
| 5,423,789 * | 6/1995 | Fung et al. | 604/367 |
| 5,454,946 | 10/1995 | Heagle et al. | 210/503 |
| 5,478,470 | 12/1995 | Fukuda et al. | 210/500.1 |
| 5,503,745 | 4/1996 | Ogata et al. | 210/490 |
| 5,554,287 | 9/1996 | Beck et al. | 210/500.29 |
| 5,554,288 | 9/1996 | Rydell et al. | 210/504 |
| 5,580,459 | 12/1996 | Powers et al. | 210/634 |
| 5,591,335 | 1/1997 | Barboza et al. | 210/323.2 |
| 5,603,830 | 2/1997 | Everhart et al. | 210/502.1 |
| 5,605,748 | 2/1997 | Kennedy et al. | 442/5 |
| 5,614,095 | 3/1997 | Degen et al. | 210/491 |
| 5,614,096 | 3/1997 | Cohen et al. | 210/502.1 |
| 5,618,622 | 4/1997 | Gillberg-Laforce et al. | 428/357 |
| 5,665,235 | 9/1997 | Gildersleeve et al. | 210/503 |
| 5,681,469 | 10/1997 | Barboza et al. | 210/503 |
| 5,709,735 | 1/1998 | Midkiff et al. | 96/17 |
| 5,718,827 | 2/1998 | Rydell et al. | 210/505 |
| 5,728,634 | 3/1998 | Everhart et al. | 442/237 |
| 5,855,784 | 1/1999 | Pike et al. | 210/505 |
| 5,855,788 | 1/1999 | Everhart et al. | 210/653 |

\* cited by examiner

FINE PARTICLE FILTRATION MEDIUM INCLUDING AN AIRLAID COMPOSITE

FIELD OF THE INVENTION

This invention relates to a fine particle filtration medium including an airlaid composite. The medium is particularly useful in the filtration of fine particles from fluids.

BACKGROUND OF THE INVENTION

This invention relates to a fine particle filtration medium including an airlaid composite for use as a filtration medium, which may be particularly useful in the filtration of fine particles from fluids. The medium of the present invention will preferably find utility in liquid filtration applications.

In the liquid filtration industry, there are many types of liquid applications that require filtering. Contaminants found in these liquids vary in size and can range, for example, from sub-micron size to over 300 microns. Because of the wide range of particle sizes found in the industry, there are a variety of media in the marketplace, each of which is specifically designed to filter a particular particle range. The filtration medium of the present invention is particularly useful in filtering fine particles.

Spunbond nonwoven webs have been used in various filtration applications, e.g. coolant filtration, cutting fluid filtration, swimming pool filtration, transmission fluid filtration, room air filtration and automotive air filtration. In liquid filtration applications, especially for large volume filtration applications, e.g., coolant and cutting fluid filtration, contaminated liquid typically is pressure vacuum driven onto a horizontally placed filter medium. Consequently, the filter medium needs to be strong enough to withstand the weight of the liquid, sludge, and the applied driving pressure. As such, liquid filter media need high strength properties in addition to suitable levels of filter efficiency, capacity and durability.

In general, composite filter media are formed by laminating a layer of a microfiber web onto a highly porous supporting layer or between two highly porous supporting layers since the microfiber layer does not have sufficient physical strength to be self-supporting, particularly under use conditions. Consequently, the production process for composite filter media requires not only different layer materials but also requires elaborate layer-forming and laminating steps, making the filter media costly. Although self-supporting single-layer microfiber filter media can be produced in order to avoid the complexity of forming composite filter media by increasing the thickness of the microfiber filter layer, the pressure drop across such thick microfiber filter media is unacceptably high, making the microfiber media unfit for filter applications, especially for high throughput filter applications. Existing microfiber filter media and laminate filter media containing microfiber webs is that they tend to exhibit weak physical properties. Consequently these filter media are not particularly useful for large volume liquid filtration uses.

Other sheet filter media widely used in the industry are cellulosic fiber webs of thermomechanically or chemically processed pulp fibers. Cellulosic fiber media are, for example, commonly used in automotive oil and fuel filters and vacuum cleaner filters. However, cellulosic fiber filter media tend to have limited filter efficiency and do not provide the high strength properties that are required for high pressure, large volume liquid filtration applications.

Yet another group of filter media that have been utilized in liquid filtration applications are calendered spunbonded nonwoven webs, especially polyester spunbond webs. For example, calendered polyester spunbond filter media are commercially available from Reemay, Inc. under the TYPAR trademark. Typically, spunbond filter media are formed by melt-spinning filaments randomly and isotropically depositing the filaments onto a forming surface to form a nonwoven web, and then calendering the nonwoven web to make it stronger, thus forming a sheet filter medium that has a relatively uniform thickness. These calendered sheet filter media exhibit good strength properties. The filter efficiency, however, of these spunbond filter media is, in general, significantly lower than that of microfiber filter media. In addition, the porosity distribution on the surface of the calendered spunbond filter media tends to be non-uniform. This is because when the spun filaments are randomly deposited on the forming surface, the filament density, i.e., the number of filament strands deposited for a given area of surface, of the deposited web, varies from one section to another; and when the deposited fiber web is calendered and compacted to a uniform thickness, the sections of high fiber density and low fiber density form low porosity and high porosity sections, respectively. Consequently, the calendered spunbond filter media tend to have a non-uniform porosity distribution.

There remains a need for economical filter media that provide a highly desirable combination of high filtration efficiency, capacity and high physical strength.

Yet another problem of prior art filters is variability in thickness. Such thickness variation translates into filtration variation as well. Variable thickness also affects convertibility issues. Since these materials are usually fed through machines with nip rollers or belts, wide variation in thickness results in slippage and jams in the machines which decreases production rates resulting in higher costs.

In the development of such products, a filtration medium which provides ample filtering ability, has uniform thickness and which will not break up during handling or use, is needed.

The filter medium including an airlaid composite of the present invention thus exhibits unexpectedly good filtering ability while being presented in a form which is easy to handle and has strength sufficient to avoid the tendency to fall apart.

SUMMARY OF THE INVENTION

The present invention pertains to a filter medium including an airlaid composite, which is made of pulp fibers, at least about 2% by weight bicomponent fiber, and moisture. This airlaid composite is unique in that, when used as a filter medium, it exhibits advantageous filtering properties as well as physical strength. The bicomponent fibers of the present invention include a first polymer component and a second polymer component, and the first polymer component melts at a temperature lower than the melting temperature of the second polymer component. Mixing of the pulp fibers with the bicomponent fibers is done in such a way that the fibers are evenly dispersed in the airlaid composite. This airlaid composite is then heated such that at least a portion of the first polymer component of the bicomponent fiber is melted, which bonds the bicomponent fibers to many of the pulp and other bicomponent fibers when cooled. Moisture is added to the composite to further facilitate bonding when the composite is subsequently subjected to calendering. Optionally, a support structure may used to supplement the strength of the airlaid composite.

The filter medium of the present invention is characterized by a drape stiffness of at least about 6 cm, and tensile strength of at least about 4 kg. It may also exhibit relatively low average pore size and bubble point.

DETAILED DESCRIPTION OF THE INVENTION

Figure 1:
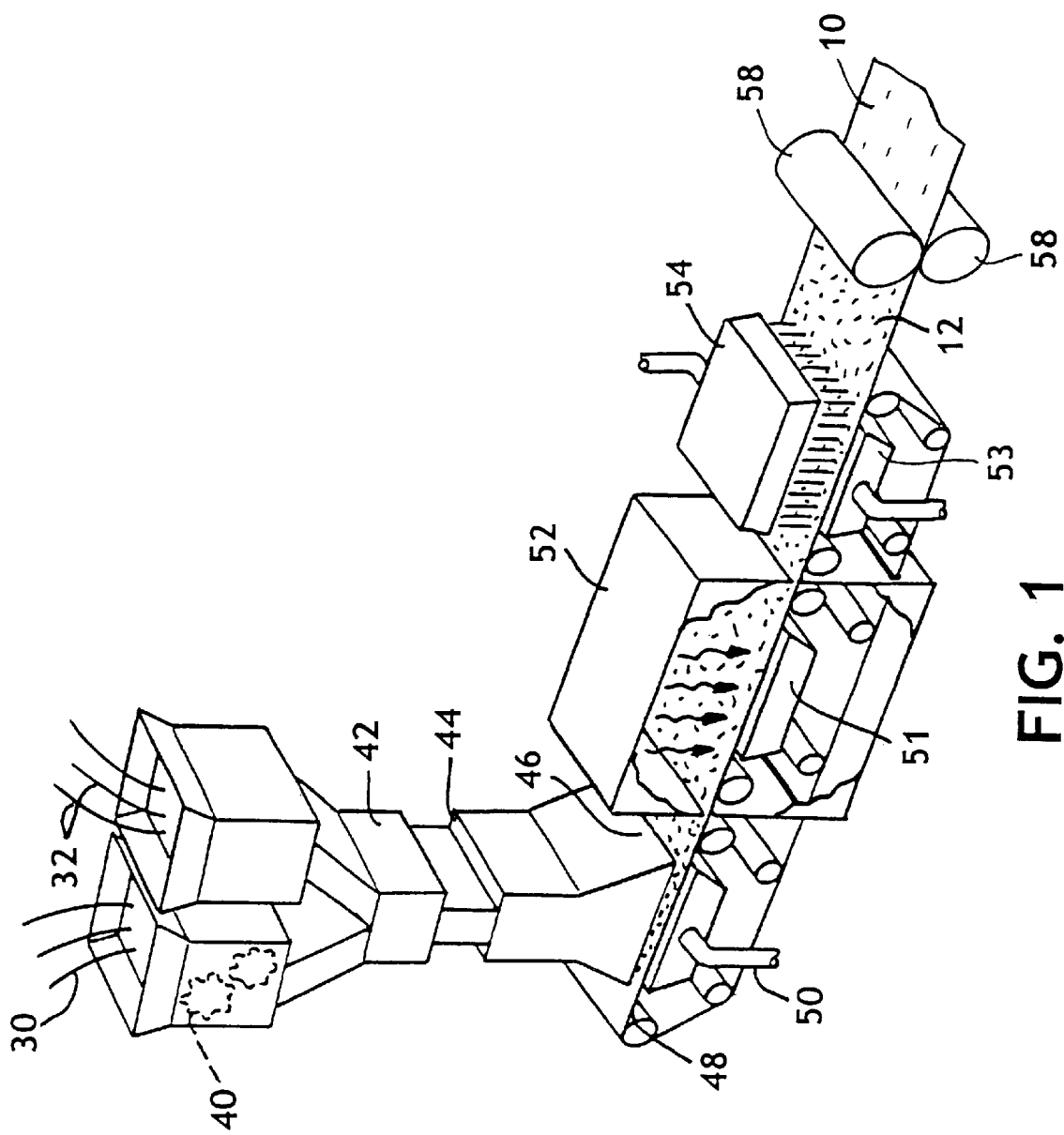
FIG. 1 is a perspective view of an apparatus and process for making the filtration medium including an airlaid composite of the present invention.

The filtration medium of the present invention is useful for filtering fine particles from a fluid. As used herein, the term "fine particle" means a particle having a size on the order of 0 to 20 microns. In other words, the filtration medium is capable of filtering particles which are on average 0 to 20 microns in size, preferably even filtering particles of 2 to 15 microns in size, most preferably filtering particles that are 2 to 10 microns in size. Although, the filtration medium of the present invention is effective as a filtering device for all types of fluids, it is particularly useful as filtration device specifically for removing fine particles from liquids.

Generally, the filtration medium includes a thin, calendered airlaid composite formed from a combination of pulp fibers and bicomponent fibers. Additionally, the filtration medium may also include a support structure.

As used herein, the term "pulp fibers" shall mean pulp fibers which are derived from wood and which retain a substantial portion of the lignin present in the unpulped wood but from which enough lignin has been removed such as to make the pulp fibers somewhat hydrophillic. The pulp fibers should have an average fiber length of at least about 2 mm, preferably 2–3 mm, for ease of mixing with the bicomponent fibers. For the airlaid composite of the present invention, it has been found that pulp fiber should be present in the composite in the range of about 70–98% by weight of the composite. Greater than about 98% pulp fiber will result in a structure that will fall apart when saturated by the fluid intended to be filtered. The pulp fibers utilized may or may not be bleached (designated as "B", e.g. BCTMP). Suitable pulp fibers include thermomechanical pulp fibers, chemithermomechanical pulp fibers, chemimechanical pulp fibers, refiner mechanical pulp (RMP) fibers, stone groundwood (SGW) pulp fibers, and peroxide mechanical pulp (PMP) fibers.

Thermomechanical pulp (TMP) fibers are produced by steaming wood chips at elevated temperature and pressure to soften the lignin in the wood chips. Steaming the wood softens the lignin so that fiber separation occurs preferentially in the highly lignified middle lamella between the fibers, facilitating the production of longer, less damaged fibers.

The preferred type of pulp fiber for use in the present invention is chemithermomechanical pulp (CTMP) fiber, also sometimes referred to as chemically-modified thermomechanical pulp fibers. In CTMP processes, wood chips, which may be softwood, hardwood or a blend of softwood and hardwood, preferably softwood, are given a mild chemical treatment in addition to a steaming step prior to mechanical defiberization and are then refined. The chemical treatment is limited so as to minimize lignin removal while increasing the ionic bonding potential of the fibers unlike conventional chemical pulping processing (which removes a major portion of the lignin). This chemical treatment used in CTMP processes has the benefit of obtaining high yield (generally >90%) from the process unlike chemical processes, which generally yield 50%. It also has additional benefits of removing some lignin while not going to the extent and cost of full chemical treatment, while minimizing adverse environmental impact compared to typical chemical processes. CTMP pulp, which may be additionally bleached, is commercially available as "SPHINX FLUFF" from Metsa-Serla Group (Tampere, Finland) and as Standard Grade 550-78 pulp from Millar Western, Ltd. (Edmonton, Alberta, Canada).

A variant of CTMP for which an analogous chemical treatment has been applied is known as chemimechanical pulp, which omits the steaming step practiced in the manufacture of TMP and CTMP. It is also known to chemically treat the pulp after the start or completion of fiberization. Such treatment can be applied to pulp which has not been previously chemically treated, or to pulp which has been previously chemically treated. Other types of pulp fibers may be useful in the present invention. Examples of these additional types include refiner mechanical pulp (RMP), stone groundwood (SGW) pulp, and peroxide mechanical pulp (PMP).

The airlaid composite of the present invention also includes bicomponent fibers. As used herein, the term "bicomponent fibers" refers to fibers which have been formed from at least two thermoplastic polymers which are extruded from separate extruders but spun together to form one fiber and which have a side-by-side arrangement or a sheath/core arrangement. In a sheath/core bicomponent fiber, a first polymer component is surrounded by a second polymer component. The polymers of the bicomponent fibers are arranged in substantially constantly positioned distinct zones across the cross-section of the bicomponent fiber and extend continuously along the length of the fibers.

Various combinations of polymers for the bicomponent fiber may be useful in the present invention, but it is important that the first polymer component melt at a temperature lower than the melting temperature of the second polymer component. Further, the bicomponent fibers are integrally mixed and evenly dispersed with the pulp fibers. Melting of the first polymer component of the bicomponent fiber is necessary to allow the bicomponent fibers to form a tacky skeletal structure, which upon cooling, captures and binds many of the pulp fibers, as well as binds to other bicomponent fibers.

Typically, the polymers of the bicomponent fibers are made up of different thermoplastic materials, such as for example, polyolefin/polyester (sheath/core) bicomponent fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton and the like.

In a sheath/core bicomponent fiber, the core can also be made of a thermosetting resin such as phenol-formaldehyde, phenol furfural, urea-formaldehyde, melamine-formaldehyde, silicone rubber, and the like. Particularly preferred in the present invention is a bicomponent fiber known as Celbond® Type 255 available from KoSa Polyester Staple, Salisbury, N.C. 28145, which is a polyester core/polyethylene sheath fiber.

The bicomponent fiber will be present in the airlaid composite in at least about 2% by weight of the composite, preferably between 2 and 30% by weight, with the substantial balance being composed of pulp fibers, in the embodiment that includes an additional support structure. If no additional support structure is to be added to the airlaid composite, then the composite will require at least about 11% by weight of the bicomponent fiber, preferably between about 11 and 30% by weight, most preferably between about 20 and 30% by weight. It has been found that no more than 30% by weight is necessary to achieve adequate bonding and that use of greater than 30% by weight is usually cost prohibitive. Airlaid composites having less than about 2% by weight bicomponent fibers did not have adequate wet integrity when saturated with fluid. As used herein, the term "wet integrity" refers to the composite's ability to maintain its structure, even when wet, as more fully discussed in the examples below. In other words, a wet composite of the invention will not fall apart, slough, or otherwise break-up when picked up or handled.

The bicomponent fiber should have a fiber length not to exceed about 1.5 inches (38.1 mm) since fibers which are too long tend to entangle with themselves rather than evenly disperse with the pulp fibers. Preferably the bicomponent fiber length will be in the range of about 0.11 to 0.6 inches (3–15 mm), most preferably about 0.15 to 0.32 inches (4–8 mm), and will have a denier of about 1.5 to 4.

Sufficient moisture addition is also required when forming the airlaid composite of the present invention to facilitate bonding of the composite upon calendering (as defined below). It is Applicants' theory that such moisture add-on facilitates bonding by creating hydrogen bonds between the pulp fibers upon calendering. Once the moisture has been added and the composite has been calendered to form a thin, calendered airlaid composite, if at least about 5% by weight of the composite is moisture, then sufficient moisture has been added during the process to facilitate bonding. Sufficient moisture add-on during processing has been found to be in the range of about 5 to about 20% by weight of the composite. For example, a sample of the airlaid composite weighing 400 grams/square meter (gsm) with 4 percent by weight bicomponent fiber and 10 percent by weight moisture would contain: 344 gsm pulp +16 gsm bicomponent fiber +40 gsm water.

It should be clear to one of ordinary skill in the art that moisture absorbed, for instance from a humid environment, after formation of the airlaid composite of the present invention is not sufficient moisture to facilitate bonding without subjecting the composite to further calendering. In other words, if the composite absorbs moisture from the atmosphere, the composite would have to be calendered to achieve the benefits of the present invention. The moisture add-on of the present invention must be added prior to calendering in order to facilitate bonding.

As used herein, the term "thin" refers to the thickness to basis weight ratio (wherein the basis weight is that of the pulp and bicomponent fibers only) of the airlaid composite and/or resulting absorbent structure. For purposes of the present invention, a thickness to basis weight ratio of about $3.0 \times 10^{-3}$ mm/1 gsm to $1.0 \times 10^{-3}$ mm/1 gsm has a distinct advantage of improved roll handling. Calendering of the composite provides a very important feature in that it reduces overall the lint associated with such filters which improves the overall appearance and reduces the tendency to add unwanted lint particles to the filtered fluid. Composites of the present invention will instead have a uniformly smooth and even surface. The thickness of these composites does not vary by more than a minor amount over the cross-section of the airlaid composite. For many of these composites there is a relatively uniform basis weight per a given area.

The filtration medium including the airlaid composite as described above has been shown to exhibit a drape stiffness, (details of the testing are given in more detail below), of at least about 6 cm, preferably at least about 6.3 cm, more preferably at least about 6.9 cm, and a tensile strength of at least about 4 kg, preferably at least about 4.3 kg. Since integrity, i.e. the ability to keep from falling apart or sloughing such that the filtration medium is no longer useful as a filter, and strength are integrally related and necessary in the filtration medium of the present invention, these improvements in properties are highly beneficial.

The airlaid composite used in the filtration medium of the present invention will usually have a basis weight of 50–500 gsm and is calendered from an initial thickness of approximately 0.50 inches to 0.75 inches (1.27–1.91 cm) and density of about 0.02–0.05 g/cc. As used herein, the term "calendering" means that the airlaid composite has been compressed at a pressure of about 800 to 4000 pounds per linear inch (pli) (143–715 kg/linear cm) preferably 1500–3000 pli (268–536 kg/linear cm), more preferably 2000–3000 pli (358–536 kg/linear cm), to form a thin, calendered airlaid composite having a thickness to basis weight ratio of $3.0 \times 10^{-3}$ mm/1 gsm to $1.0 \times 10^{-3}$ mm/1 gsm, a thickness of 0.025–0.15 cm and a density of 0.5 g/cc or higher. Such calendering is not the same as the compaction and compression usually utilized in the airlaying industry. Instead, it is closer to that which is used in the paper industry (known as "super calendering") in that it is conducted at much higher pressures. It has been theorized that such calendering is critical in forming the airlaid composite of the present invention because this creates stored energy in the airlaid composite due to the hydrogen bonding, three-dimensional orientation of the pulp fibers and the resilient nature of the pulp fibers. Subsequent contact with fluids allows the pulp fibers to separate and return to a more relaxed configuration resulting in an open porous structure suitable for filtration.

The filtration medium of the present invention will advantageously have an average pore size of less than about 100 microns, preferably less than about 25 microns, and most preferably from about 5 to about 10 microns.

It has been found that when the filtration medium is used in a form that is flat, it is effective in filtering the fluid. Alternatively, the filtration medium may be corrugated to maximize surface area and filtration efficiency, as will be understood by one of ordinary skill in the art.

Properties, (as discussed in more detail below in connection with the examples), such as filtration efficiency, tensile strength, thinness (thickness to basis weight ratio), stiffness, wet integrity and overall appearance are all important properties for structures of the present invention. When these airlaid composites are made according to this invention, the following benefits are displayed in the airlaid composites. For one, a higher density, therefore reduced thickness, results in overall improvements to roll handling, storage and transportation because more of the airlaid composite can be placed on a roll. When more material is on the roll, production is improved because less down time is needed for roll changing, and less space is needed for storage and transportation. Also, improvements in stiffness along with the tensile strength exhibited by the airlaid composites of the present invention allows for improved processing since there will be less breaks when converting rolls to pads. Most importantly, the filtration medium of the present invention has been found to be more efficient in the removal of fine particles than other types of filters. In fact, for each of the properties tested, this medium performed better than the comparative examples in each and every test it was subjected to.

Although not required in the present invention, the filtration medium may additionally include one or more support structures attached to one or both sides of the airlaid composite. The support structure may be provided to supplement the integrity (i.e., to keep the airlaid composite intact) and strength of the filtration medium. The support structure may be present as a matrix of fibrous material, or may be in the shape of a frame-like structure. If present as a matrix of fibrous material, the material may be in the form of a woven, knit, scrim or nonwoven fabric. The support structure, when present, may be bonded to the airlaid composite by any suitable method including calendering, adhesive bonding, sonic bonding, or combinations thereof. One example of a suitable support structure includes a nonwoven layer. As used herein the term "nonwoven layer" means a layer having a structure of individual fibers or threads which are interlaid, but not in an identifiable manner as in a knitted fabric. Nonwoven layers have been formed from many processes such as for example, meltblowing processes, spunbonding processes, and bonded carded web processes. Other examples of suitable support structures include Typar® polypropylene spunbond available from Reemay of Old Hickory, Tenn., and Cerex® nylon spunbond available from Cerex Advanced Fabrics, L.P. of Cantonment, Fla. Yet another example of a support structure suitable for use in the present invention includes a liquid bag application, wherein the airlaid composite is enclosed in the bag.

Spunbond nonwoven webs are formed from spunbond fibers. As used herein the term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns ($\mu$m), more particularly, between about 10 and 20 microns ($\mu$m).

Meltblown nonwoven webs are formed from meltblown fibers. As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al. Meltblown fibers are microfibers which may be continuous or discontinuous, are generally smaller than 10 microns ($\mu$m) in average diameter, and are generally tacky when deposited onto a collecting surface.

As used herein, the term "scrim" means a lightweight fabric used as a backing material. Scrims are often used as the base fabric for coated or laminated products.

As used herein, the term "coform" means a process in which at least one meltblown diehead is arranged near a chute through which other materials are added to the web while it is forming. Such other materials may be pulp, superabsorbent particles, cellulose or staple fibers, for example. Coform processes are shown in commonly assigned U.S. Pat. Nos. 4,818,464 to Lau and 4,100,324 to Anderson et al. Webs produced by the coform process are generally referred to as coform materials.

Process for making the Filtration Medium including an Airlaid Composite

Preparation of the filtration medium begins with formation of the airlaid composite. The pulp must be fiberized by a process of breaking up rolled or baled pulp into fine pulp fibers. Since pulp is purchased in either rolled or baled form and the pulp is thus in a dense, hard form, fiberization is required to get the pulp in a usable form. There are many known methods for fiberizing pulp. See, for example, U.S. Pat. No. 3,825,194 to Buell, U.S. Pat. No. 4,100,324 to Anderson and U.S. Pat. No. 3,793,678 to Appel.

Once the pulp is fiberized, it is ready to be blended with the bicomponent fibers. Blending of the fibers begins with metering the pulp fibers and bicomponent fibers at the desired weight ratio into a mixer. As will be generally understood by one of ordinary skill in the art, metering may be variable by as much as ±1–2% by weight of each component due to machine capability. Various methods for metering the fibers are known including using a screw auger, pocket chamber or by drop feeding. The pulp fibers and bicomponent fibers are then integrally mixed in a mixing step, which is important because good dispersion of the bicomponent fibers in the pulp fibers is necessary to effect the bonding which will be discussed in more detail below. Methods of mixing include blending in an airstream or other mechanical mixing device (e.g. an attrition mill) and the like.

The integrally mixed pulp fibers and bicomponent fibers are then formed into an airlaid composite by conveying the fibers by air through a forming head or nozzle and feeding the fibers continuously onto an endless forming surface, such as a wire screen. A vacuum means may also be included for drawing the fibers against the screen. Unlike most airlaying processes and unique to this process, compressing or compacting of the thus formed airlaid composite is not required, as will be illustrated in the examples below.

As used in the prior art, compaction utilized a set of rollers above and below the airlaid material to compact it in order to increase its self-adherence and thereby its mechanical integrity for further processing. Compaction rolls performed this function well but were considered to have a number of drawbacks including a decrease in bulk or loft regain in the final product that was considered undesirable.

It is important for the present invention that the airlaid composite remain in its lofty array until the composite has been subjected to a heating and cooling means so that proper and thorough bonding between many of the pulp fibers and bicomponent fibers and/or between bicomponent fibers may occur while still in that lofty array. The airlaid composite does not, therefore, have high mechanical integrity at this point of the process. It is also important to note that wet laying processes would not work in the present invention because it would not be possible to achieve the lofty array required for bonding if the composite were wet-laid prior to the bonding step.

The airlaid composite may be formed in continuous sheet as describe above or alternately, individual pads or pledgets may be formed on equipment such as, for example, a drum former. A drum former has discontinuous pockets in the circumferential surface, each pocket having a permeable surface at the bottom of the pocket. A vacuum is drawn on the interior of the drum through the permeable surface, thereby allowing air flow into the pocket causing the pulp fibers, bicomponent fibers, and any granular or powder products entrained in the air to lodge in the pocket. The remaining circumferential surface of the drum is impermeable to air so that the fibers do not form on this flat surface. As the drum rotates, the vacuum is blocked and the fibrous material trapped in the pocket is transferred by means of vacuum, pressure, and/or mechanical means to a forming surface, resulting in placement of individual pledgets on the forming surface which are discretely spaced apart from one another. These pledgets may be subsequently carried through the remainder of the process by a carrier sheet layer such as pulp tissue or nonwoven layer. Alternately, the individual pledgets may be transferred through the process by a series of vacuum belts and mechanical means. A pledget may be suitable for use in combination with a frame-like support structure to form the filtration medium.

In one embodiment of the present invention, a roll of a support structure such as a nonwoven web, e.g. a spunbonded nonwoven web, may be unwound and conveyed on the forming surface and the pulp/bicomponent fiber mixture airlaid onto the surface of the support structure.

The airlaid composite is then subjected to a bonding step in which the composite passes through a heating means to activate the bicomponent fibers to bond the airlaid composite (e.g. to melt the sheath of a sheath/core bicomponent fiber). Heating allows the bicomponent fibers to form a tacky skeletal structure, which upon cooling, captures and binds many of the pulp fibers.

Heating of the airlaid composite may be achieved for example, by dry heat, as by passing hot air through the composite or by heating it in an electric oven. It is important that the heating conditions are controlled at a temperature and air flow rate sufficient to melt only the first polymer component of the bicomponent fiber, while not melting the second polymer component (e.g., melt the sheath and not the core). As will be understood by one of ordinary skill in the art, proper temperatures and airflow rates are dependent on the type of polymers used in the bicomponent fibers. Of course, the proper heating condition will also be a function of the heating rate of the airflow. As the airflow rate is increased, a lower temperature may be utilized, while decreased flow rate will require an increased temperature to achieve melting within the same time interval. Whatever the conditions used, it is important that the air flow rate not be set at a rate which will result in compression of the airlaid composite as uniform melting will not occur in a compressed composite. It will also be understood that the heating may be achieved by other means such as exposing the airlaid composite to radiation, for example, infrared radiation of a suitable intensity and duration.

It will be understood by one of ordinary skill in the art that subjecting the airlaid composite to such a heating means will remove any surface moisture that may have been present in the composite up to that point. It is a requirement of the present invention that the airlaid composite be then re-moisturized. The moisturizing and heating step may occur simultaneously if, for instance, moist heat is used such as by the use of moist hot air or superheated steam, as long as adequate amounts (as described above) of moisture are imparted thereby and sufficient temperatures are reached to melt the sheath of the bicomponent fiber. Likewise, these steps may be independent steps. In that case, one such method of moisturizing the airlaid composite may be by exposing the composite to a spray of atomized water. Whatever the method utilized, it is important that the moisture be distributed evenly through the airlaid composite. Thus, for example, a vacuum box may be positioned below the airlaid composite to draw the moisture through the composite, thereby improving distribution of the moisture in the z-direction (thickness direction) of the airlaid composite.

Alternatively, a humidity chamber or high-pressure steam may be used to add moisture to the airlaid composite. Typical settings of the humidity chamber may be set at for instance 90 percent relative humidity and 70° F. (21.1° C.). Both the humidity chamber and the high pressure steam methods would most likely not require a vacuum, while the application of moisture using a spray atomizer, would most likely require a vacuum.

Once the airlaid composite has been heated, it must be cooled prior to calendering to re-solidify the bicomponent fibers, thus binding the bicomponent fibers to the pulp fibers and/or binding the bicomponent fibers together. If the moisturizing step occurs simultaneously with the heating step, a separate cooling is advantageous. If, on the other hand, the moisturizing and heating steps are independent steps, cooling can also be effected during the moisturizing step by varying the temperature of the moisture applied to the airlaid composite. Furthermore, an independent cooling step that occurs between the heating and moisturizing steps may be useful. For purposes of the present invention, it has been found that sufficient cooling occurs when the moisture is applied at ambient temperature. Other means of cooling will be known by those of ordinary skill in the art.

After forming the airlaid composite, a support structure may be attached to one or both sides of the composite whether or not a support structure has been attached earlier in the process. The support structure may also be attached by unwinding a previously made support structure and attaching to either side of the airlaid composite. The sheet layers will preferably be attached such that the structure will not easily delaminate.

The airlaid composite, including additional support structure(s) if present, will then be calendered as defined above. Such calendering may occur, for instance, using preferably two steel rolls or a series of rolls in such a spatial relationship and pressure as to calender the airlaid composite therebetween. Other examples of roll combinations also include a steel roll and a rubber (or rubber-coated) roll; and a steel roll and a paper covered roll. Alternatively, a press could also be used to calender the composite, requiring that the material or press be indexed and stopped on the wire and then pressed. Such an arrangement could also incorporate cutting of the composites into individual filter elements, thereby combining the calendering and cutting in one step. The calendered airlaid composite gains dry tensile strength and a reduction in bulk (thickness) from the calendering. It is important that calendering be conducted at ambient or only slightly elevated temperatures (e.g. the rolls are not generally heated) because higher temperatures would damage the airlaid composite.

The thin, calendered airlaid composite thus formed has strength sufficient such that it may be rolled up or handled in sheet form for storage, transportation or unwinding purposes, and sufficient to prevent sloughing or otherwise breaking up when saturated. Tensile strength has been measured for the airlaid composites of the present invention as discussed more fully below in the examples.

FIG. 1 illustrates diagrammatically a form of apparatus suitable for forming the filtration medium including an airlaid composite 12 of the present invention. Pulp fibers 30 are fiberized in a fiberizer 40 and metering means 42 combine the pulp fibers 30 with bicomponent fibers 32. Pulp fibers 30 and bicomponent fibers 32 are then integrally mixed in a mixer 44. A separate mixing step will not always be required. For instance, when the density of the pulp fiber is about 1 g/cc and the density of the bicomponent fiber is about 0.9 g/cc, the two fibers will readily mix together in the turbulent airflow, which is typical in an airlaying process. The fibers are thus formed into an airlaid composite 12 by conveying the fibers by air through a forming head 46 and feeding the fibers continuously onto an endless forming surface 48, while sufficient vacuum means 50 secure the composite without decreasing its lofty state. The airlaid composite 12 is then conveyed through a heater 52, which may also utilize heater vacuum means 51 to secure the composite and to draw off the hot air. The heater 52 melts the first polymer component of the bicomponent fibers 32 without melting the second polymer component. As shown, the airlaid composite 12 is then conveyed through a moisturizer 54, which may also utilize moisturizer vacuum means 53, whereby the moisturizer 54 both cools the composite causing the bicomponent fibers 32 to bind the pulp fibers 30, and adds moisture to the composite. The thus formed airlaid composite 12 is then compressed using a calendering means 58 to form a thin, calendered airlaid composite 10.

Figure 2:
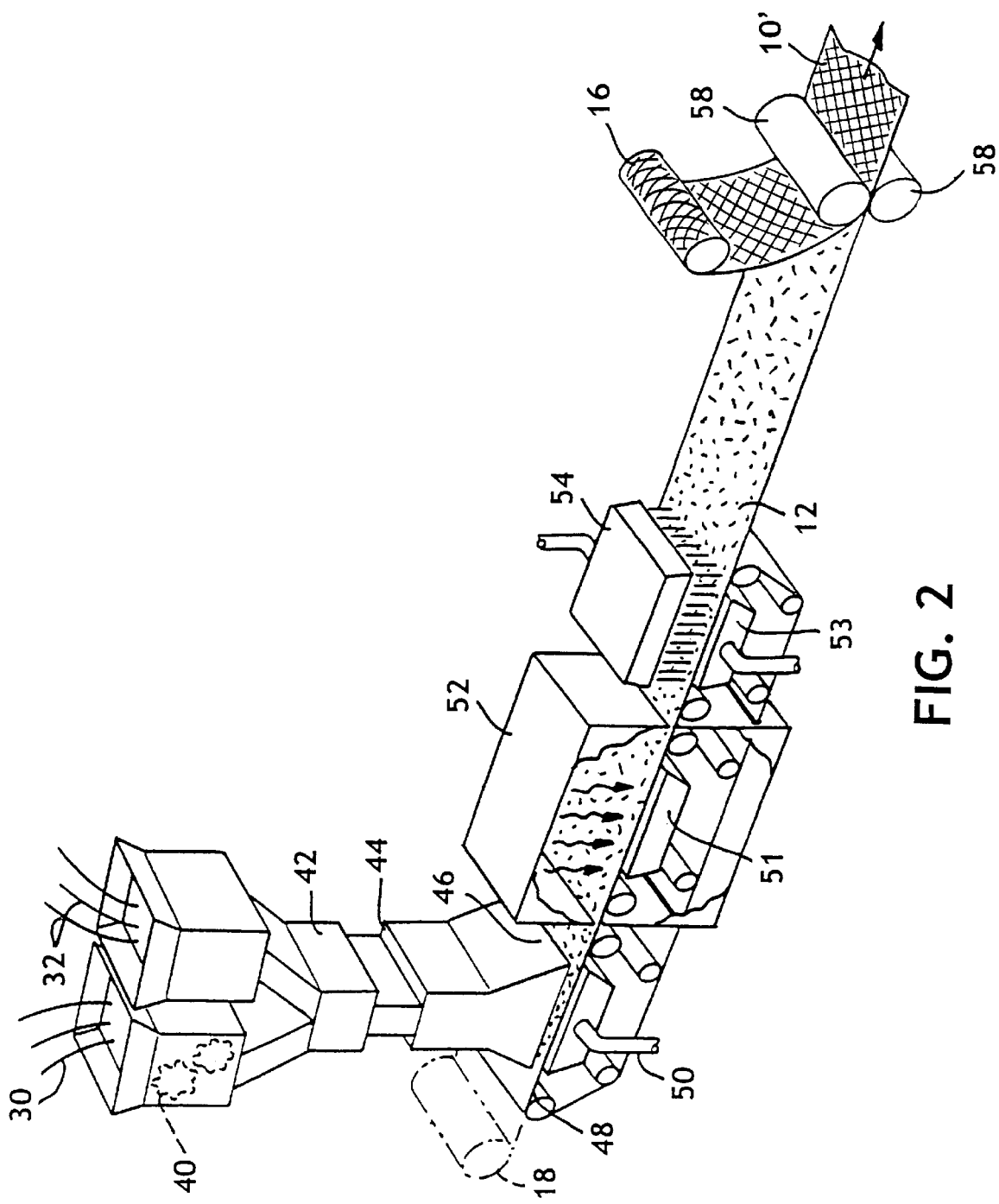
FIG. 2 is a perspective view of an apparatus and process for making the filtration medium of the present invention including a support structure.

FIG. 2 illustrates diagrammatically a form of apparatus suitable for attaching support structure 16 and/or 18, which is essentially the same as that described in FIG. 1 above with the exception that an additional support structure(s) is attached to the airlaid composite 12. As used herein, like numbering represents like elements between the drawings. A support structure such as a spunbond nonwoven web 18 may optionally be added to the forming surface 48 such that the airlaid composite 12 is formed directly on the spunbond nonwoven web 18. Additionally or alternatively, a support structure such as scrim 16 may be attached to the airlaid composite. The airlaid composite with additional support structure(s) is then calendered to form the filtration medium 10'. Of course, it will be understood that it is not necessary to calender the support structure if other means for attachment are provided as discussed above.

Figure 12:
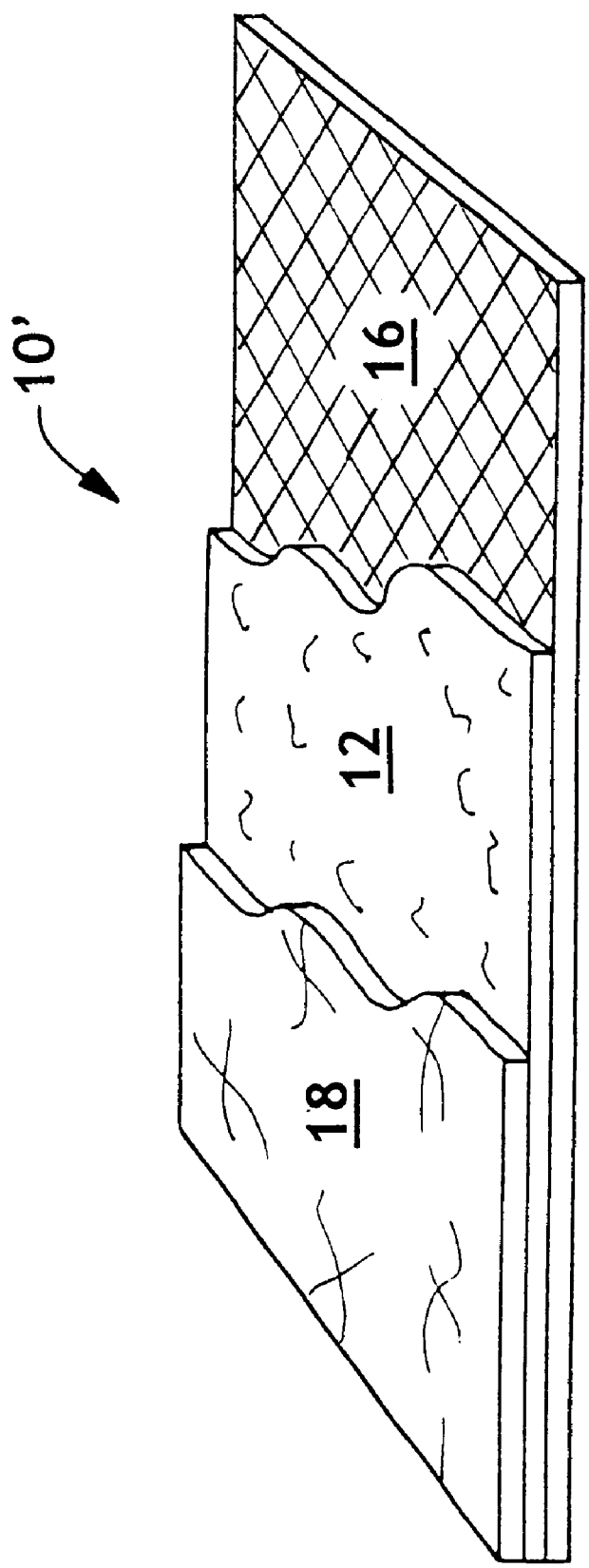
FIG. 12 is a perspective view of a multi-layered filtration medium according to the present invention.

FIG. 12 illustrates diagrammatically, layers of a multilayered composite wherein the airlaid composite 12 is supported on both sides by a layer of support structure. As shown here, one support structure is in the form of scrim 16 and the other support structure is in the form of spunbond nonwoven web 18 to form the filtration medium 10'.

Figure 10:
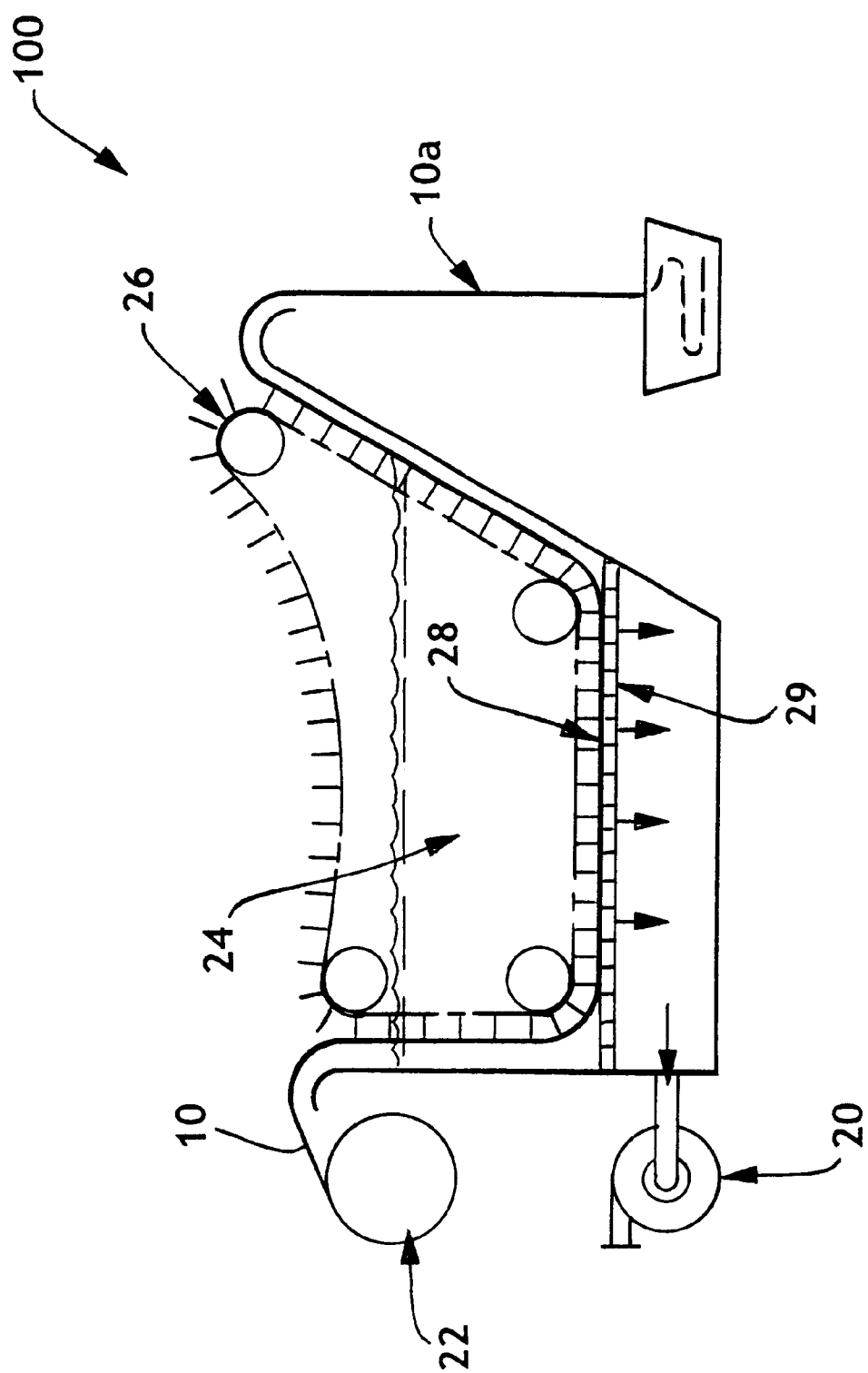
FIG. 10 is a perspective view of a typical filter system that may utilize the filtration medium of the present invention.
Figure 11:
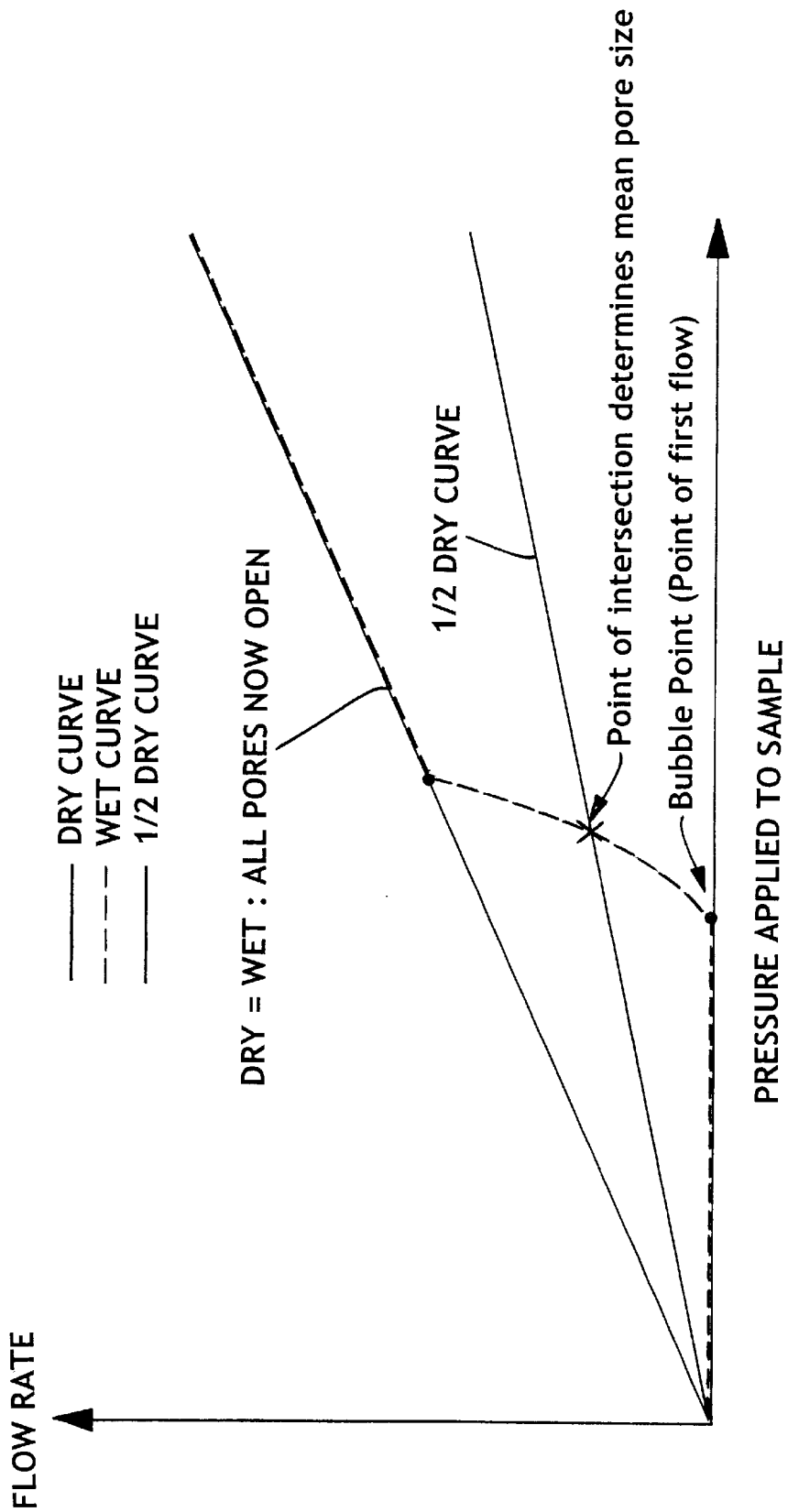
FIG. 11 is a perspective view of a graphic representation of a generic graph explaining the significance of the previous curves including how the bubble point is determined.

FIG. 10 illustrates diagrammatically actual use of the filtration medium 10 of the present invention in a flat bed vacuum filtration system generally designated at 100. The flat bed vacuum filtration system 100 generates a vacuum, as show herein, using a vacuum pump 20 beneath the filtration medium 10 to provide a greater differential for a higher driving force. The filtration medium 10 is fed from roll 22 through the liquid to be filtered 24 via the medium conveying device 26. As the sludge 28 collects on the surface of the filtration medium 10, the cleaned liquid passes through the septum 29, pulled through by vacuum pump 20. The spent or dirtied filtration medium 10a is conveyed out of the filtration system and discarded.

The following examples are offered by way of illustration, not by way of limitation.

EXAMPLES

Samples of the present invention and comparative examples were prepared as described below. The samples were then subjected to the following tests. Tests were designed to determine properties of the samples tested, not necessarily to simulate actual use conditions.

Weight of the composite: The weight of the samples used for the examples below was determined by cutting a piece of the filtration medium and weighing it on a conventional scale. The weight was recorded in ounces or grams. The basis weight was determined by dividing the weight by the area of the cut sample. If measured in ounces, the conversion was made to grams.

Thickness: Thickness was measured using a hand held, manually raised, Starrett bulk tester having an anvil of 3 inches (7.62 cm) diameter, a weight of 80 grams, a 4×4 in (10.16×10.16 cm) sample size, under a controlled loading pressure of 0.05 psi. The thickness was recorded in inches.

Wet Integrity: As described above, a sample which has been saturated with fluid is considered to have wet integrity if it does not fall apart, slough, or otherwise break-up when picked up or handled. For the examples of the present invention as described below, the samples had wet integrity.

Drape Stiffness: The "Drape Stiffness" test measures the drape stiffness or resistance to bending of the composite. The bending length is a measure of the interaction between the composite weight and stiffness as shown by the way in which the composite bends under its own weight, in other words, by employing the principle of cantilever bending of the composite under its own weight. In general, the sample was slid at 4.75 inches per minute (12 cm/min), in a direction parallel to its long dimension, so that its leading edge projected from the edge of a horizontal surface. The length of the overhang was measured when the tip of the sample was depressed under its own weight to the point where the line joining the tip to the edge of the platform made a 41.5° angle with the horizontal. The longer the overhang, the slower the sample was to bend; thus, higher numbers indicate stiffer composites. This method conforms to specifications of ASTM Standard Test D 1388.

The test samples were prepared as follows for the mechanical property testing. Samples were cut into rectangular strips measuring 1 inch (2.54 cm) wide and 6 inches (15.24 cm) long, unless otherwise noted. Five specimens of each sample were tested. A suitable Drape-Flex Stiffness Tester, such as FRL- Cantilever Bending Tester, Model 79-10 available from Testing Machines Inc., located in Amityville, N.Y., was used to perform the test.

The drape stiffness, measured in inches, is one-half of the length of the overhang of the specimen when it reaches the 41.5° slope. The drape stiffness reported below of the sample was the arithmetic average of the results obtained from the samples tested in each of the machine and cross-machine directions, reported separately. The drape stiffness of the sample was reported to the nearest 0.01 inch (0.254 mm).

Tensile Strength: The cut strip test method measures tensile (breaking) strength of the composites when subjected to a continually increasing load in a single direction at a constant rate of extension. The method used conforms to ASTM Standard Test D 5034-95, as well as Federal Test Methods Standard No. 191A Method 5102-78, with the following exceptions: 2×6 inch (5.08×15.24 cm) sample size, 10 lb. (4.56 kg) load cell, 25 cm/min. crosshead speed (a constant rate of extension), and a gauge length of 4 inches (10.16 cm). Results were expressed in units of weight (to break).

Samples were tested and results expressed in grams to break. Higher numbers indicate a stronger structure. The specimen was tested, for example, on an 1130 Instron, available from the Instron Corporation, or a Thwing-Albert Model INTELLECT II available from the Thwing-Albert Instrument Co., 10960 Dutton Rd., Philadelphia, Pa. 19154. Additionally, unless otherwise noted, the samples were tested under dry conditions, which includes only the moisture add-on which was necessary to form the airlaid composite. Where noted, some samples were also tested under wet conditions, which added fluid to the sample to test strength performance under conditions that more closely resemble actual use. In such cases, 10 ml of fluid was applied and tested instantaneously to the center of the sample prior to subjecting it to the test as described above.

Capillary Flow Porometry Test: Data was generated for FIGS. 3 to 9 using a capillary flow porometer such as that available from Porous Materials Inc. (PMI) of Ithaca, N.Y. Data was collected for 5 repetitions conducted for each sample and the averages were plotted in the Figures.

The PMI Capillary Flow Porometer provided through-pore analysis including bubble point, pore size distribution, mean pore size, liquid, and Frazier permeability.

The underlying physical phenomenon upon which this technique is based is capillary action. More specifically, PMI's analytical technique is based upon the attraction between a liquid and the pores of a solid. In this model, liquid-liquid attractive forces and liquid-solid attractive forces exist. The relative magnitude of liquid-liquid interactions versus liquid-solid interactions determines the degree to which a particular liquid will "wet" the surface of the solid. If the magnitude of liquid-liquid attraction is relatively much greater than liquid-solid attraction, poor wetting will occur. Themodynamically, incomplete wetting is observed because the free energy of "wetting" is only slightly negative; thus, the liquid does not cover the solid. Conversely, large liquid-solid interactions lead to efficient wetting. This testing technique relies upon the effective wetting of a solid by a liquid.

Two properties of liquids, both intimately related, allow for prediction of the degree of wetting of a particular solid surface; surface tension, and contact angle. Liquids with low surface tensions readily wet solid surfaces, owing to relatively small liquid-liquid attractive forces.

As stated above, Capillary Flow Porometry requires that a liquid completely wet the surface of a solid and fill the pores of the solid. The PMI Porometer allows the user to use virtually any fluid, provided the contact angle is approximately zero, i.e. the fluid wets the sample material. Should the contact angle be nonzero, the calculated pore size will be larger than the actual pore size. As tested herein, SILWICK silicon oil having a surface tension of 21.0 dynes/cm, available from Dow Chemical Company, was used as the wetting fluid.

Obtaining pore size information from the wetted sample was straightforward. As discussed above, wetting takes place because of favorable energies of interaction between liquid and solid. Of course, to remove the liquid from the solid interface (i.e. from the pores of the sample), this energy of attraction must be overcome, i.e. work must be done on the system. By applying gas pressure to one side of the sample material, this energy of attraction was overcome. The fundamental equation for porometry can be derived as follows:

$$\sigma = \frac{h\rho g r}{2B\cos(\theta)}$$

and
p=hgρ
and $$d = \frac{4\cos(\theta)B\sigma}{p}$$

(for a wetting fluid, cos(θ)=1)
and $$d = \frac{4B\sigma}{p}$$

where:
h=height of rise of liquid
θ=contact angle
ρ=density of fluid
g=gravitational constant
d=pore diameter
σ=surface tension of liquid (dynes/cm) (mN/m)
p=differential pressure applied to sample and
B=capillary constant The equation predicts the amount of pressure required to expel a liquid of known surface tension (σ) from a pore of diameter (d). That is to say, this amount of pressure (force) is required to overcome the attraction of the liquid to the surface of the material. The first step in pore size characterization is to determine the largest pore size, the so called bubble point, historically named the bubble point due to an ASTM standard which calls for visual detection of bubbles passing through the sample. This technique is used by the majority of nonwoven manufacturers for characterization of the largest pore size. Automation of this process through the use of, for instance PMI's Capillary Flow Porometer, has eliminated the problem of irreproducibility and subjectivity in bubble point determination. The automated technique uses a sophisticated data collection and processing scheme that monitors, among other factors, pressure, flow rates, and rates of change of pressure and flow rates. High-speed analysis of these variables is used to determine the exact pressure at which the largest pore opens and begins to pass flow of air.

An important point is that capillary flow porometry tests only "through" porosity, i.e. pores that pass completely through the sample. This selectivity arises from the fact that the measurement technique is based upon flow of gas through the material. If a pore does not pass entirely through the media, no flow is possible and the instrument overlooks this pore. Another caveat is that this technique assumes that no pore is larger than its smallest restriction. For a pore to completely empty, liquid must be forced from the narrowest section of the pore, which of course requires a pressure corresponding to this narrowest diameter. Sample Preparation:

Samples of the material to be tested were sized to be large enough to cover the screen of a holder of the capillary flow porometer. The screen for the porometer used for this test was 0.6 inches (1.524 cm) in diameter. The material was mounted in the holder (dry-up/wet-up mode) and airflow was forced through the material. The edges of the material were sealed to prevent air from flowing around the material. Air was applied to one side of the material at controlled pressures. The flow rate of the air passing through the material was measured and pore distribution was determined as described above. In the wet test, all of the pores of the material were filled with the wetting fluid. The sample was completely submerged in the wetting fluid, allowing sufficient time for the sample to soak up the wetting fluid. The pressure was increased slowly, measuring flow at each pressure. Initially, the pressure was not sufficient to overcome the wetting property of the fluid, and the pores remained filled, thereby allowing no passage of air. When the pressure was increased sufficient to force the fluid out of the largest pores, flow began. The flow was increased until all of the pores were empty.

Figure 3:
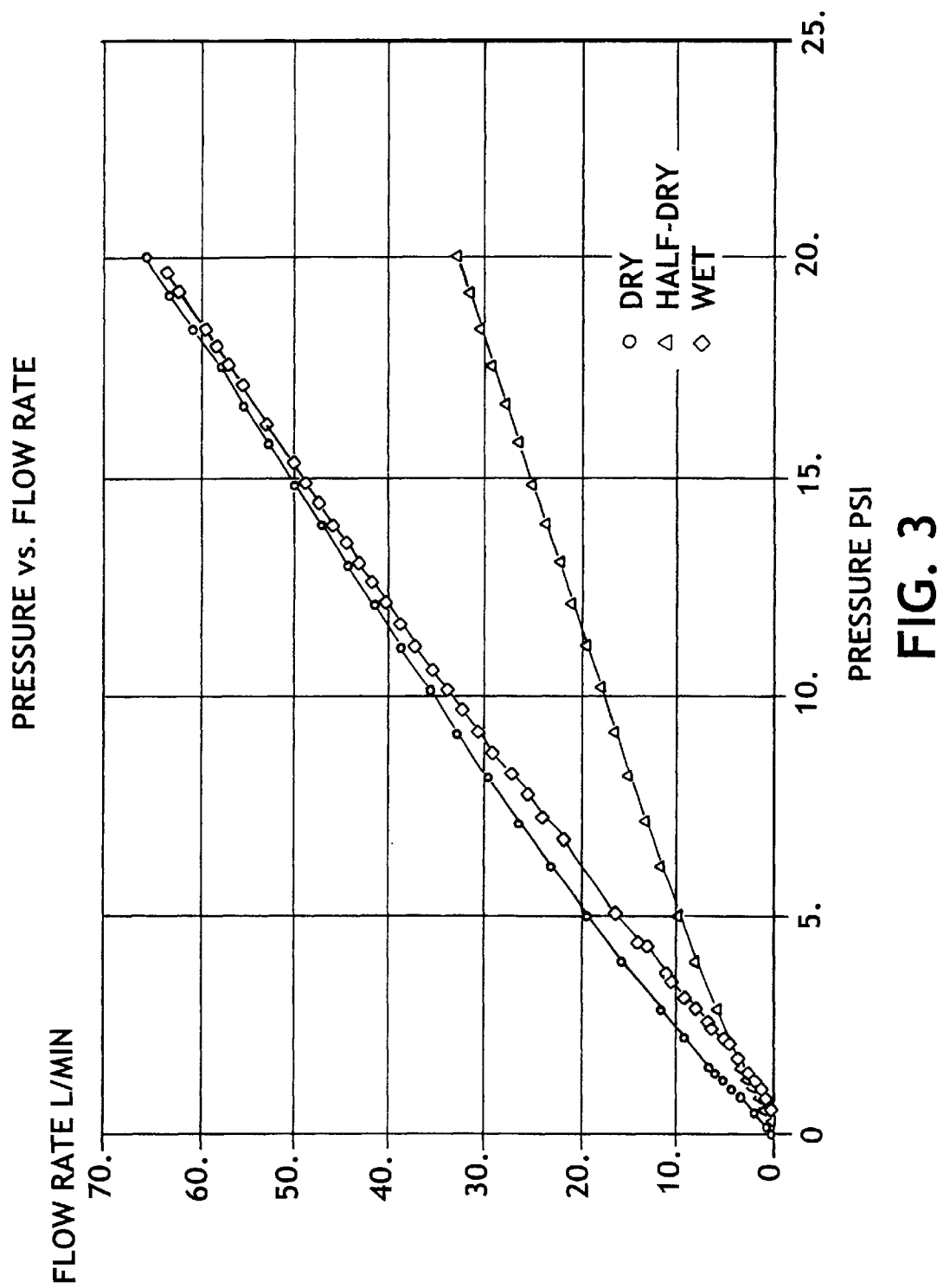
FIG. 3 is a graphic representation of the wet, dry and half-dry results for the filter medium of the present invention.
Figure 4:
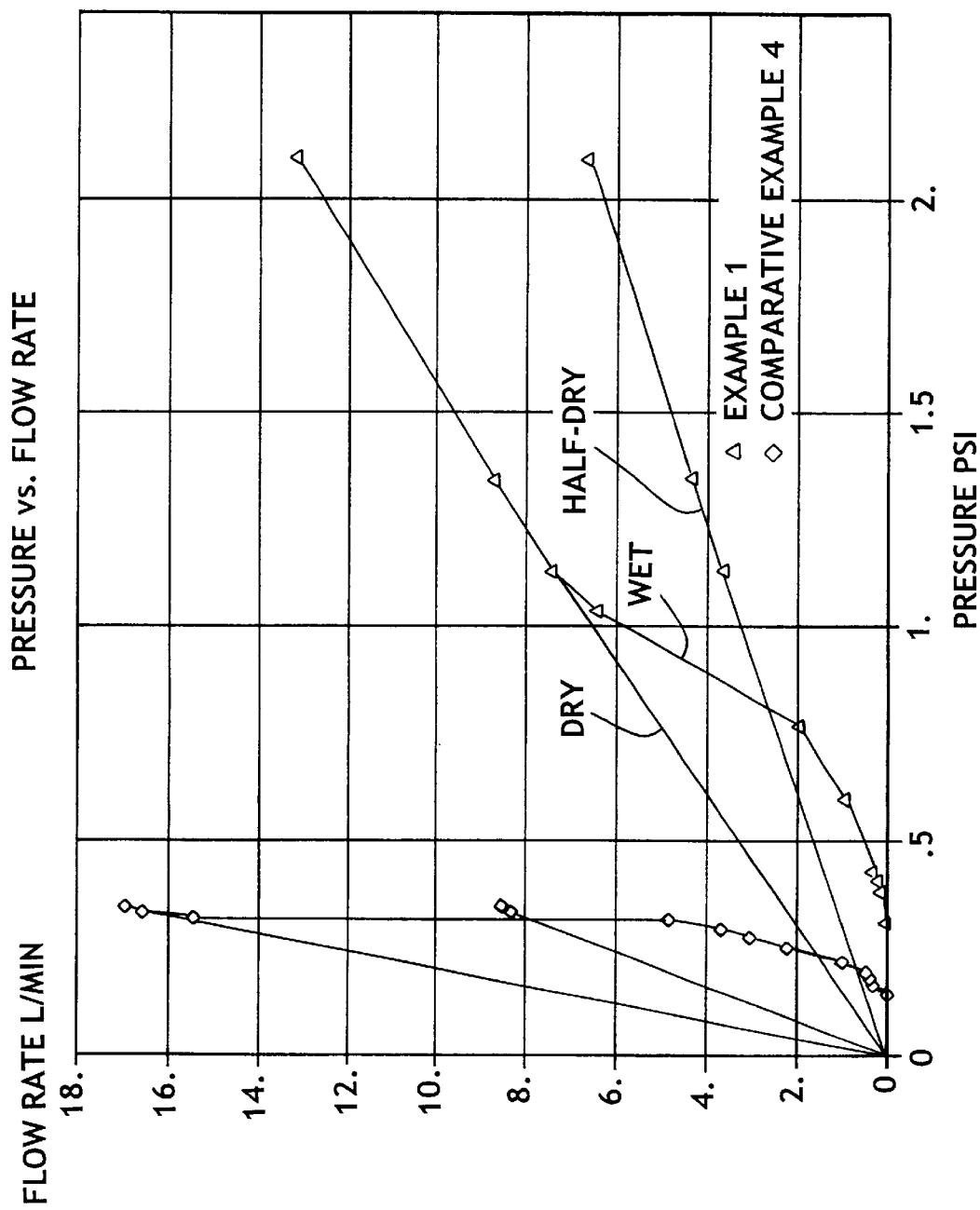
FIGS. 4 and 5 are graphic representations of the improved filtration ability of the fine particle filtration medium of the present invention as compared to filters of the prior art showing pressure versus flow rate results for the tested materials.
Figure 5:
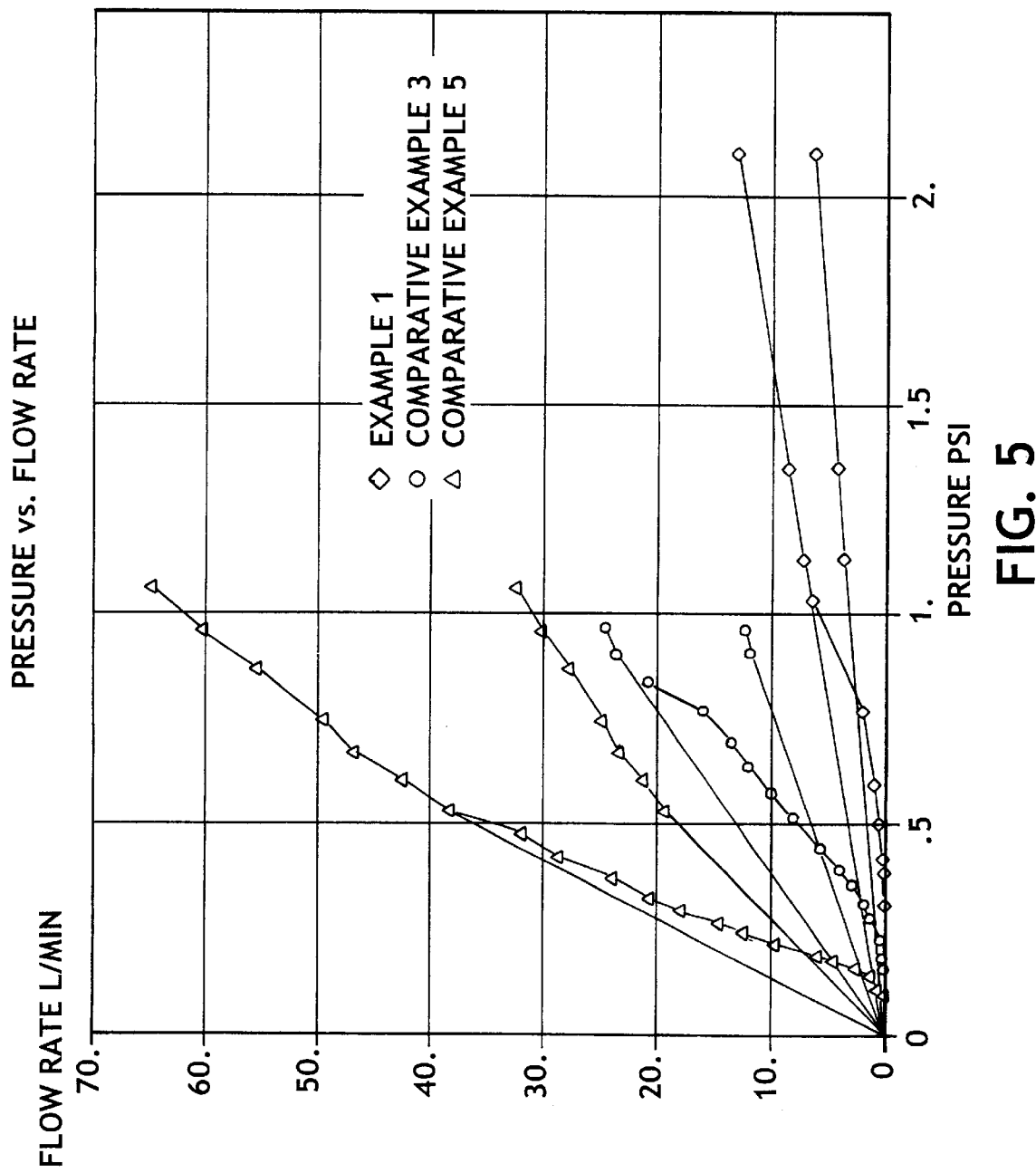

In the dry test, the pores of the material remain open. Pressure and flow data were recorded over the same ranges as the wet test. Data from the wet and dry tests were plotted on the graphs of pressure versus flow rate. The half-dry flow curve was also plotted, which consisted of the same pressure as the dry test and half of the flow rate from the dry test. Where the half-dry flow curve intersected the wet curve, the corresponding pressure gave the mean flow pressure, which was used to determine pore diameter per the above equation. In FIG. 3, pressure versus flow was plotted for the filter medium of the present invention. The results of the dry test were represented and plotted as a diamond shape—"◊", while the half-dry test was plotted as a cross—"+", and the wet test was plotted as an "x". FIG. 4 represents pressure versus flow rate for the filter medium of the present invention as x and a comparative example, Comparative Example 4—a coform material formed on TYPAR, as ◊. In each case, the upper curve represents the dry test while the lower curve represents the half-dry test. The intersecting curve represents the wet test. Likewise, FIG. 5 represents pressure versus flow rate for the filter medium of the present invention as ◊ and two comparative examples, Comparative Example 5—a 25 micron ($\mu$) felt material as +, and Comparative Example 3—a 1 micron ($\mu$) felt material as x.

Figure 6:
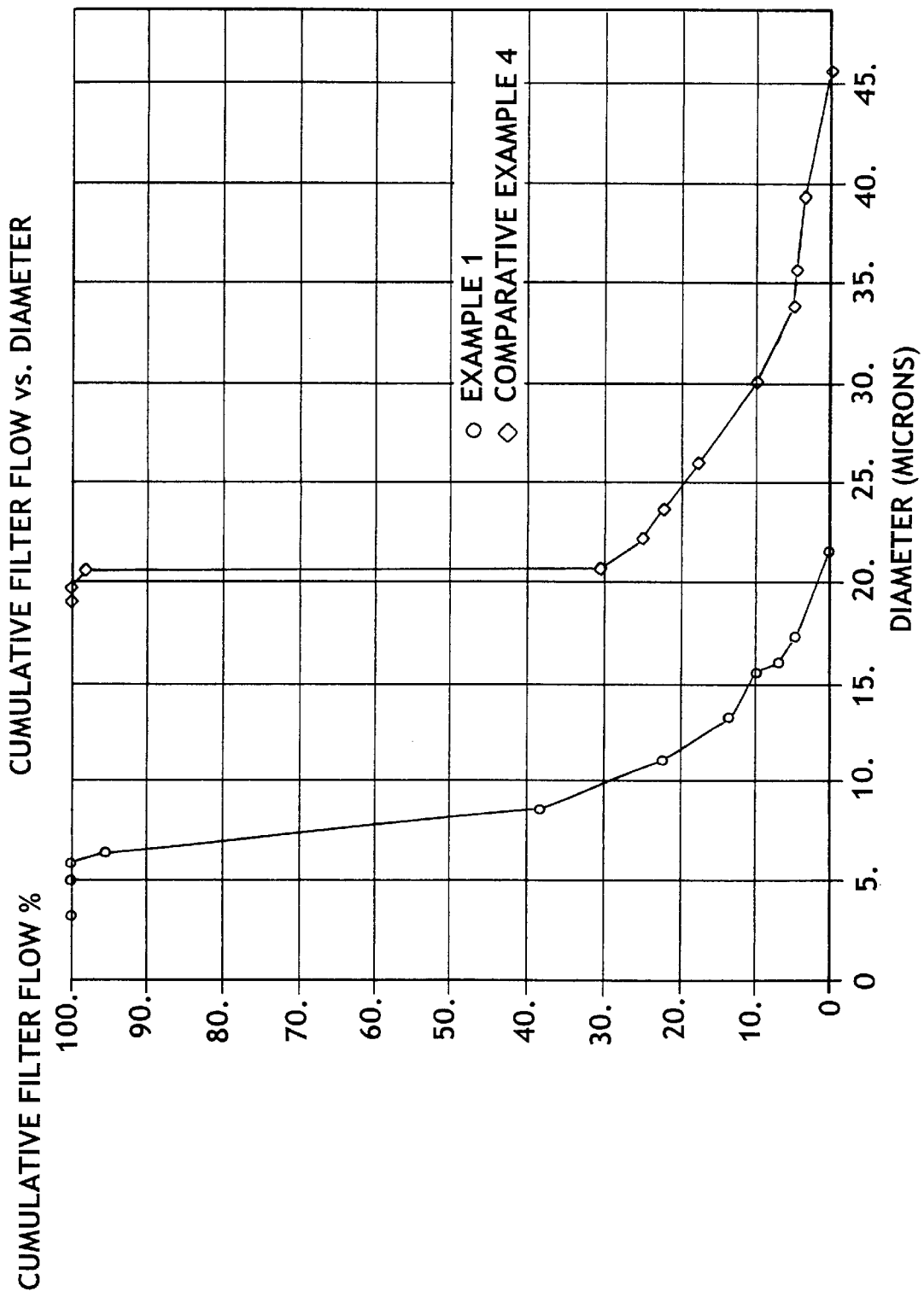
FIGS. 6 and 7 are graphic representations of the improved filtration ability of the fine particle filtration medium of the present invention as compared to filters of the prior art showing cumulative filter flow versus pore diameter results for the tested materials.
Figure 7:
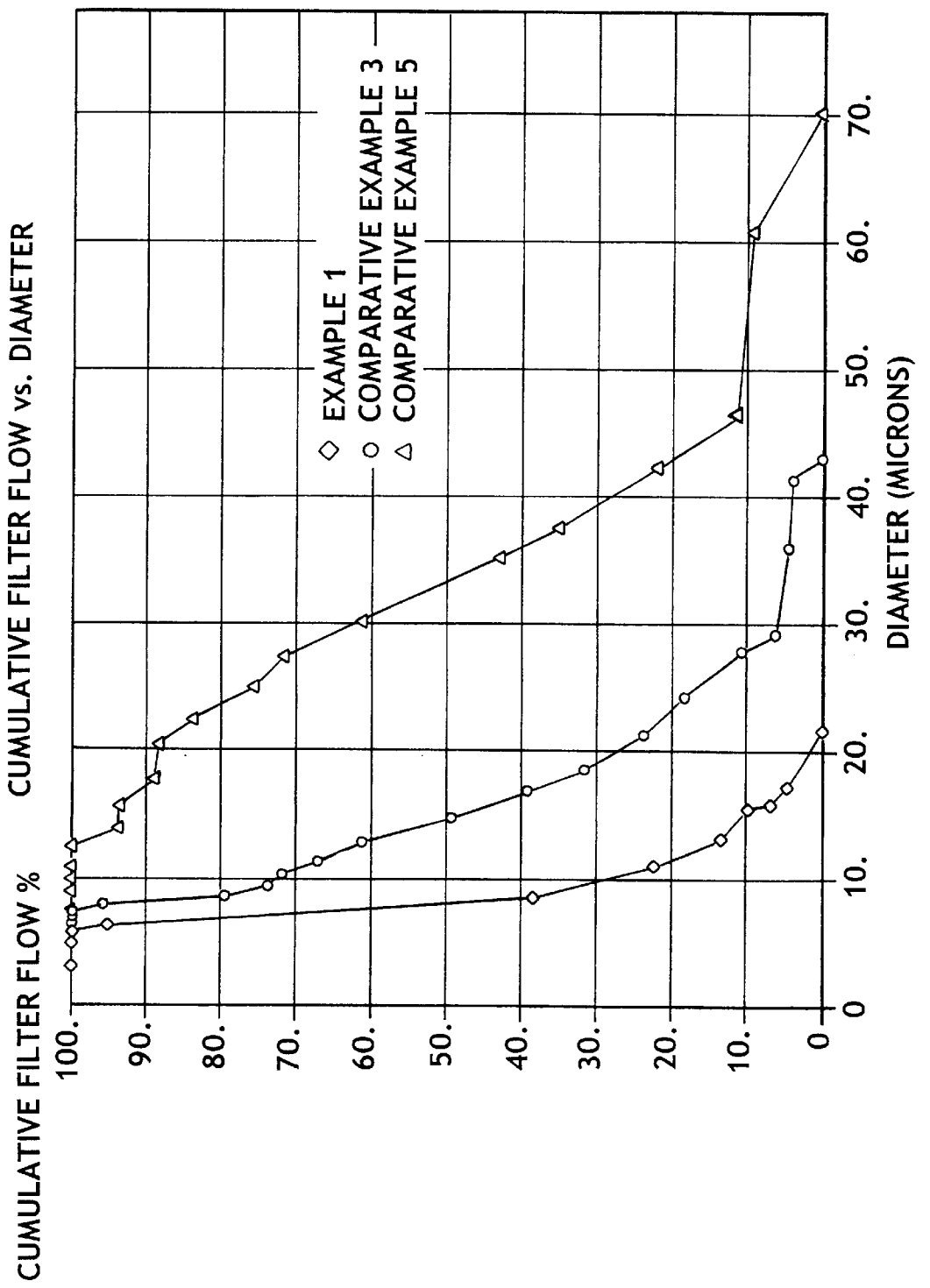

The cumulative filter flow was calculated from the ratio of wet flow to dry flow for each pressure. In FIGS. 6 and 7, cumulative filter flow was plotted versus pore diameter. The flow was 0% when the wet flow was zero and 100% when the wet flow was equal to the dry flow. FIG. 6 represents cumulative filter flow versus pore diameter for the filter medium of the present invention as x and a comparative example, coform formed on TYPAR, as ◊. Likewise, FIG. 7 represents cumulative filter flow versus pore diameter for the filter medium of the present invention as ◊ and two comparative examples, Comparative Example 5—a 25 micron ($\mu$) felt material as +, and Comparative Example 3—a 1 micron ($\mu$) felt material as x.

Figure 8:
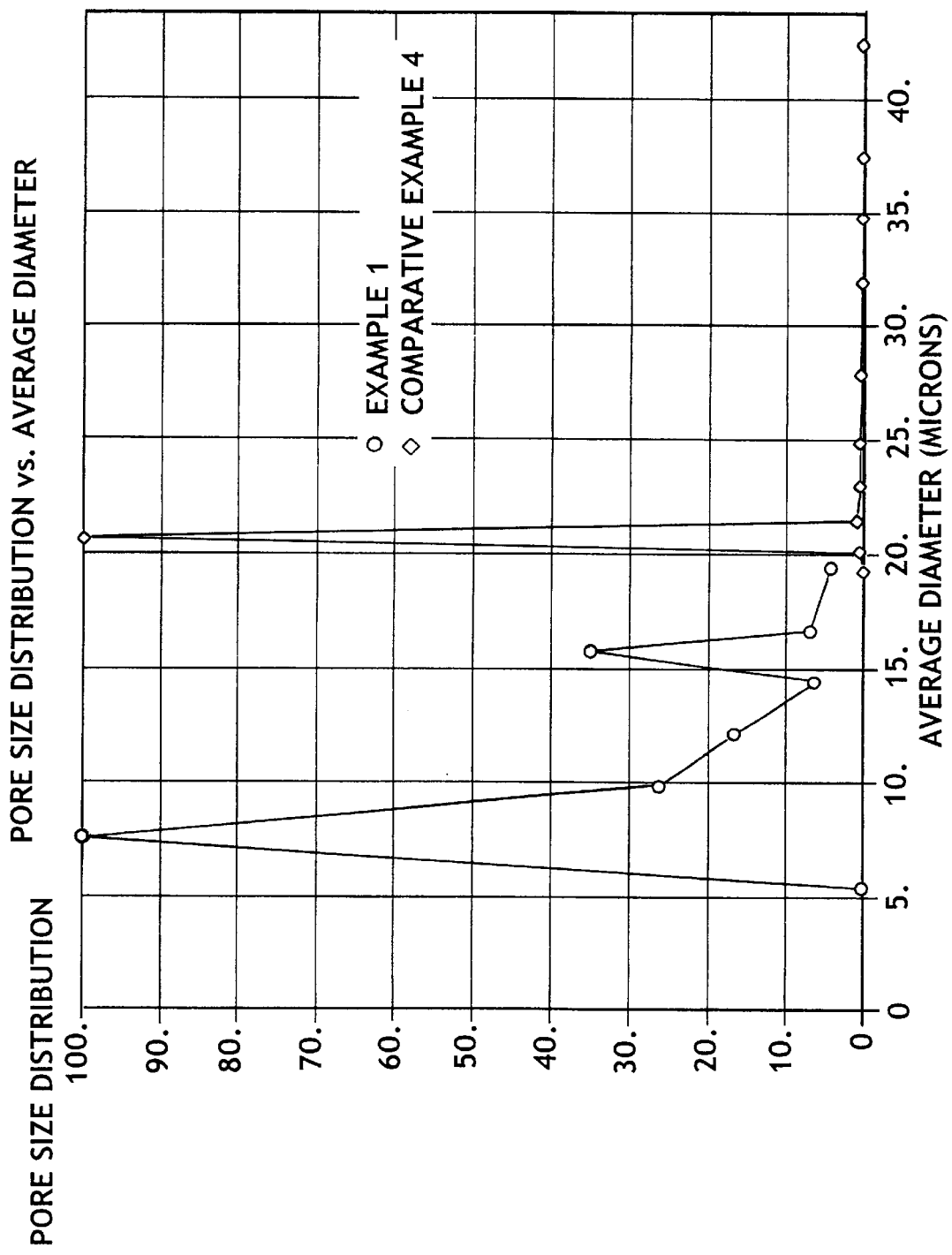
FIGS. 8 and 9 are graphic representations of the improved filtration ability of the fine particle filtration medium of the present invention as compared to filters of the prior art showing pore size distribution versus average pore diameter results for the tested materials.
Figure 9:
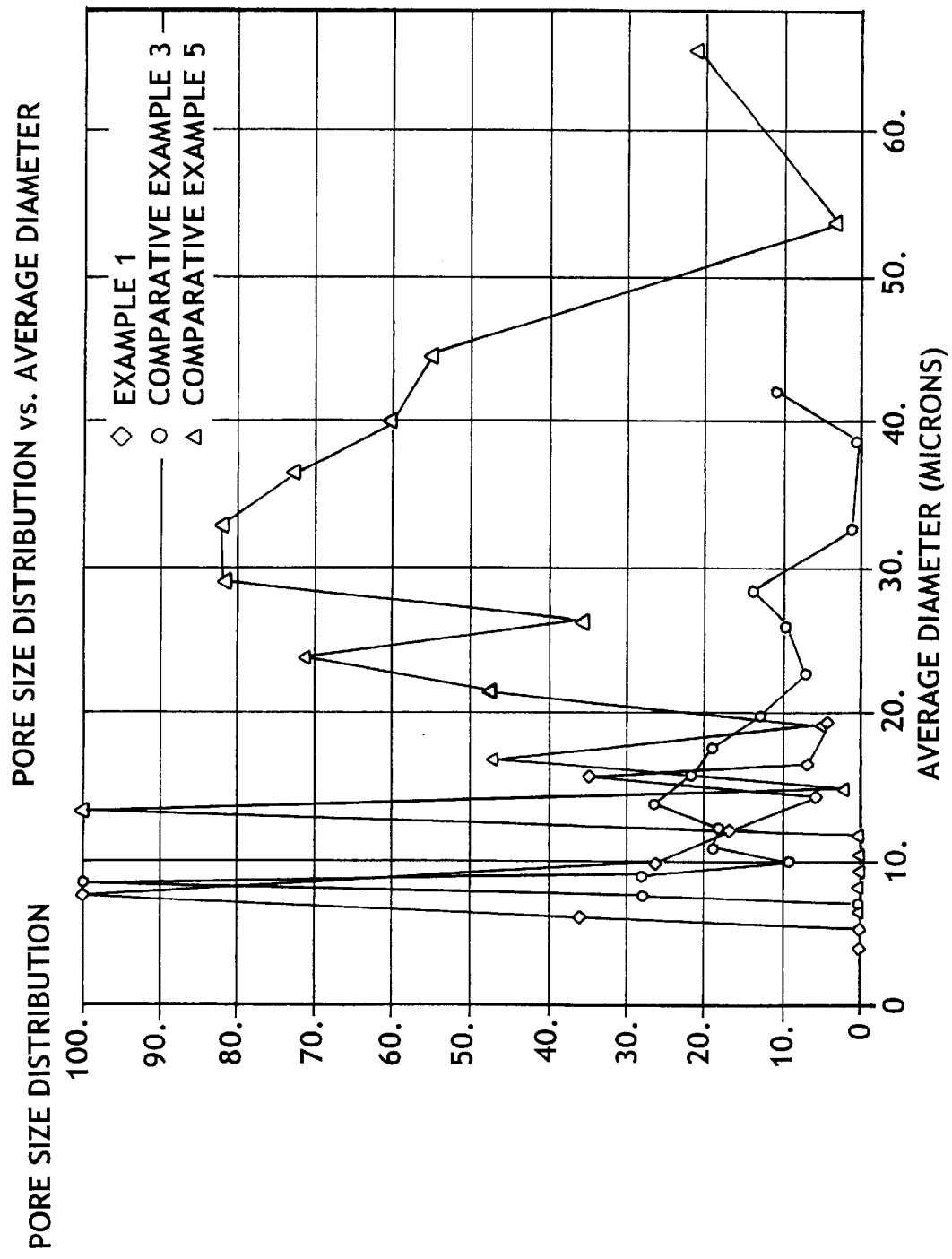

Lastly, the pore size distribution versus the average pore diameter was plotted in FIGS. 8 and 9. FIG. 8 represents pore size distribution versus average pore diameter for the filter medium of the present invention as x and a comparative example, Comparative Example 4—coform formed on TYPAR, as ◊. Likewise, FIG. 9 represents pore size distribution versus average pore diameter for the filter medium of the present invention as ◊ and two comparative examples, Comparative Example 5—a 25 micron ($\mu$) felt material as +, and Comparative Example 3—a 1 micron ($\mu$) felt material as x.

Example 1 and Comparative Examples 2–5

A filter medium sample was made according to the following process. Pulp fiber (in this case BCTMP) was provided as "SPHINX FLUFF" available from Metsa-Serla Group (Tampere, Finland) and was fiberized into a usable fiber form. The pulp fibers were combined with 4% by weight bicomponent fibers known as Celbond® Type 255, non-food grade, undyed fibers that are polyester core/polyethylene sheath bicomponent fibers. (It should be understood that either support structure(s) and/or increased bicomponent fiber would be required if the sample were used in actual filtering conditions.) The bicomponent fibers had a length of 0.25 inches (6.35 mm) and a denier of 2.8, Merge #34821A, and were available from KoSa as described above. The fiber mixture was conveyed via an air stream to a mixing point where it was blended with and integrally mixed with bicomponent fibers according to the conventional airlaying process described generally in U.S. Pat. No. 4,640,810 to Laursen et al., assigned to Scan Web of North America, Inc. A filter medium of 11 osy (374 gsm), which was 0.077 inches (0.196 cm) thick was thus formed.

There was no compression of the airlaid composite by a compaction roll or compression roll before heating or cooling of the composite. The bicomponent fibers were then melted by conveying the un-compacted airlaid composite through a conventional forced air bonding oven at a rate of approximately 10 to 12 fpm (3.1 to 3.7 meters/min.) and temperature of 335° F. (168.3° C.), thereby melting at least a portion of the polyethylene sheath. Upon leaving the oven, the airlaid composite was cooled by moisture addition. Cooling solidified the polyethylene sheath, thereby bonding the bicomponent fibers to many of the pulp fibers and binding many of the bicomponent fibers together.

The additional cooling and moisturizing was conducted using a spray atomizer which added a quantity of water as noted in the table below at a rate of 1019 gallons/min. (3857.3 l/min) to the airlaid composite. A vacuum box under the forming wire applied a vacuum of 1.08 psi (7472 Pa) to draw the water evenly through the airlaid composite. The composite was then wound onto a roll 30 inches (76.2 cm) wide.

The moisturized airlaid composite was then calendered at a pressure of 2000 pli (357.2 kg/linear cm). Five repetitions of the thus formed thin, calendered airlaid composite were tested as described above and the average values are as shown below in Table 1 and in the Figures.

As comparative examples, the following materials, materials which have found utility as filter mediums, were tested as described above. Comparative Example 2 was a meltblown nonwoven web made of polypropylene per the process as described above for meltblown webs. Comparative Example 3 was a 1 micron rated felt material, commercially available from Filtration Group, Inc. (FGI) of Joliet, Ill. Similarly, Comparative Example 5 was a 25 micron ($\mu$) felt material, commercially available from FGI. Comparative Example 4 was a laminate of a coform material and TYPAR. The coform material was manufactured according to the process described above and included the following materials: 40% polypropylene resin PF 015, available from Montell U.S.A., Inc. and 60% fluff pulp such as Coosa pulp 0054. The coform material was formed on a 13.7 gsm wettable spunbond nonwoven web as a carrier. The coform material was additionally attached to a 1.9 osy (64 gsm) TYPAR 2 g polypropylene spunbond available from Reemay. As shown in the table below, the filter medium of the present invention was able to filter smaller particles and had a lower bubble point than the materials of the comparative examples.

TABLE 1

| EXAMPLE NO. | FILTRATION MEDIUM osy (gsm) | SMALLEST PORE SIZE (micron) | BUBBLE POINT (micron) |
|---|---|---|---|
| 1 | 11 (374) | 5 | 22 |
| C2 | 4 (135) | 12 | 28 |
| C3 | 1 micron rated | 10 | 40 |
| C4 | 5.6 (190) | 20 | 45 |

Additionally, drape stiffness and tensile strength were determined for the various materials and the results are reported in Table 2 below:

TABLE 2

| Property | 1 |
|---|---|
| MD Tensile Strength (kg) | 4.3 |
| CD Drape Stiffness (cm) | 6.9 |
| MD Drape Stiffness (cm) | 6.2 |
| Thickness inches (cm) | 0.077 (0.196) |

Analysis of the Figures

FIGS. 4 and 5 represent pressure versus flow rate for the filter medium of the present invention (Example 1) as x and Comparative Example 4 as ◇. As can be seen in the figures, the filter medium of the present invention exhibits improved filtering efficiency because the pressure vs. flow rate curve is flatter than that of the Comparative Example 4 curve. The flatter the curve, the better filtration of fine particles will be achieved. Likewise, in FIG. 5, Example 1 performs better than either of the comparative examples: Comparative Example 5—the 25 micron ($\mu$) felt material as +, and Comparative Example 3, the 1 micron ($\mu$) felt material as x.

Turning to FIGS. 6 and 7, the cumulative filter flow was plotted versus pore diameter. In each of the figures, Example 1 performs better than the comparative examples in that the filter medium of the present invention exhibits more efficient filtration at all of the pore sizes.

Lastly, for FIGS. 8 and 9, the pore size distribution is represented by the peak on each graph. For the filter medium of the present invention, the majority of its pore sizes are approximately 8 microns as compared to approximately 21 for Comparative Example 4 (FIG. 8), and approximately 9 microns for Comparative Example 3 and approximately 12 microns for Comparative Example 5 (FIG. 9). If the majority of the pores are smaller, more efficient fine particle filtration will take place.

While various patents and other reference materials have been incorporated herein by reference, to the extent there is any inconsistency between incorporated material and that of this written specification, the written specification shall control. In addition, while the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

I claim:

1. A filtration medium comprising:
   a thin, calendered airlaid composite further comprising:
   a) pulp fibers;
   b) at least about 11% by weight bicomponent fiber comprising a first polymer component and a second polymer component, wherein said first polymer component melts at a temperature lower than the melting temperature of said second polymer component, and further wherein said bicomponent fibers are integrally mixed and evenly dispersed with said pulp fibers and said first polymer component is bonded to many of said pulp fibers and bicomponent fibers; and
   c) moisture;
   wherein percent by weight is based on the total weight of a) and b), and further wherein said airlaid composite has a drape stiffness of at least about 6 cm, and a tensile strength of at least about 4 kg.

2. The filtration medium of claim 1 wherein the medium is effective as a filtering device for gas and liquid fluids.

3. The filtration medium of claim 2 wherein the medium is effective as a filtering device for liquids.

4. The filtration medium of claim 1 wherein said airlaid composite comprises about 11–30% by weight bicomponent fiber.

5. The filtration medium of claim 1 wherein said airlaid composite comprises about 20–30% by weight bicomponent fiber.

6. The filtration medium of claim 1 wherein said medium is corrugated to maximize surface area and filtration efficiency.

7. The filtration medium of claim 1 wherein said medium has an average pore size of less than about 100 microns.

8. The filtration medium of claim 4 wherein said medium has an average pore size of less than about 25 microns.

9. The filtration medium of claim 1 wherein said medium has an average pore size of about 5 to about 10 microns.

10. The filtration medium of claim 1 wherein said medium is effective for filtering fine particles having a size of about 0–10 microns.

11. A filtration medium comprising:
   a) a thin, calendered airlaid composite further comprising:
      i) pulp fibers;

ii) at least about 2% by weight bicomponent fiber comprising a first polymer component and a second polymer component, wherein said first polymer component melts at a temperature lower than the melting temperature of said second polymer component, and further wherein said bicomponent fibers are integrally mixed and evenly dispersed with said pulp fibers and said first polymer component is bonded to many of said pulp fibers and bicomponent fibers; wherein percent by weight is based on the total weight of i) and ii), and further wherein said airlaid composite has a drape stiffness of at least about 6 cm, and a dry tensile strength of at least about 4 kg;

iii) moisture; and b) a support structure.

12. The filtration medium of claim 11 wherein said airlaid composite comprises at least about 2–30% by weight bicomponent fiber.

13. The filtration medium of claim 12 wherein said support structure comprises a matrix of fibrous material.

14. The filtration medium of claim 13 wherein said matrix of fibrous material comprises woven, scrim, knit or nonwoven fabrics.

15. The filtration medium of claim 12 wherein said support structure comprises a frame-like structure.

16. The filtration medium of claim 14 wherein said support structure further comprises a frame-like structure.

17. The filtration medium of claim 12 wherein said medium is corrugated.

18. The filtration medium of claim 12 wherein said medium has an average pore size of less than about 100 microns.

19. The filtration medium of claim 12 wherein said medium has an average pore size of less than about 25 microns.

20. The filtration medium of claim 12 wherein said medium has an average pore size of about 5 to about 10 microns.

21. The filtration medium of claim 12 wherein said medium is effective for filtering fine particles having a size of about 0–10 microns.

22. A filtration medium comprising:

a) a thin, calendered airlaid composite further comprising:
   i) pulp fibers;
   ii) at least about 2% by weight bicomponent fiber comprising a first polymer component and a second polymer component, wherein said first polymer component melts at a temperature lower than the melting temperature of said second polymer component, and further wherein said bicomponent fibers are integrally mixed and evenly dispersed with said pulp fibers and said first polymer component is bonded to many of said pulp fibers and bicomponent fibers;
   iii) moisture; and b) a support structure; wherein percent by weight is based on the total weight of i) and ii), and further wherein said airlaid composite has a drape stiffness of at least about 6 cm, a bubble point of less than about 27 microns, and a dry tensile strength of at least about 4 kg.

23. The filtration medium of claim 22 wherein said airlaid composite comprises about 2–30% by weight bicomponent fiber.

24. The filtration medium of claim 22 wherein said support structure is a matrix of fibrous material.

25. The filtration medium of claim 24 wherein said matrix of fibrous material comprises woven, scrim, knit or nonwoven fabrics.

26. The filtration medium of claim 23 wherein said support structure comprises a frame-like structure.

27. The filtration medium of claim 23 wherein said airlaid composite has a bubble point of less than or equal to 22.

28. The filtration medium of claim 22 wherein said medium is effective for filtering fine particles having a size of about 0–10 microns.

* * * * *